United States Patent Office 3,520,881
Patented July 21, 1970

3,520,881
LOWER ALKOXYTETRAHYDROPYRANYL ETHERS OF ESTROGENIC STEROIDS
Alexander D. Cross, Mexico City, Mexico, and John A. Edwards, Los Altos, Calif., assignors to Syntex Corporation, Panama, Panama, a corporation of Panama
No Drawing. Filed May 22, 1968, Ser. No. 731,301
Int. Cl. C07c *173/00*
U.S. Cl. 260—239.55    21 Claims

ABSTRACT OF THE DISCLOSURE

The 4' - (lower) alkoxytetrahydropyran - 4'-yl ethers of estrogen steroids have high oral activities.

---

This invention relates to novel and useful 4'-(lower) alkoxytetrahydropyran-4'-yl ethers of estrogen steroids, the steroid nucleus thus bearing a new group represented by the formula:

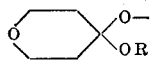

wherein —OR is a (lower) primary or secondary alkoxy group. In the preferred embodiment, this new group is added at the C–3, C–17 or C–3, 17β positions of the steroid nucleus.

The preferred estrogen steroidal ethers of this invention can be represented by the formula:

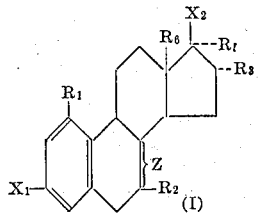

wherein
$R_1$ is hydrogen, methyl, methoxy, hydroxyl or conventional hydrolyzable esters thereof; or X;
$R_2$ is hydrogen or methyl; and when Z is a single bond, $R_2$ can be alpha or beta oriented;
$R_3$ is hydrogen, hydroxy or conventional hydrolyzable esters thereof (e.g. lower acyloxy or lower cycloacyloxy groups) when Z is a single bond and is hydrogen when Z is a double bond;
$R_5$ is hydrogen, a lower alkyl group, such as methyl, ethyl, propyl, and the like, a lower alkenyl group, such as vinyl and the like, or a lower alkynyl (including halo lower alkynyl with a halogen, such as fluoro, chloro or bromo), such as ethynyl, fluoroethynyl, chloroethynyl, bromoethynyl, propynyl, trifluoropropynyl, butynyl, hexynyl, and the like, or

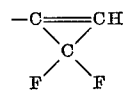

$R_6$ is methyl or ethyl;
X is a 4' - (lower)alkoxytetrahydropyran - 4' - yloxy group;
$X_1$ and $X_2$ each is hydrogen, hydroxy or conventional hydrolyzable esters thereof, lower alkoxy, lower cycloalkoxy, lower cycloalkenyloxy, tetrahydropyran-2'-yloxy, or X; or $X_2$ and $R_5$ together can be keto; and at least one of $X_1$ and $X_2$ is X;
Z is a single or double bond.

The preferred estranes are estra-1,3,5(10)-trienes having ether groups at the C–3, C–17 and C–3, 17 positions of the steroidal nucleus. The term "estrogen steroids" is used herein as denoting estranes having an aromatic A ring, with or without additional unsaturation such as double bonds between the C–7 and C–8 positions of the nucleus.

The terms "(lower-alkyl" and derivations thereof appearing in the above definitions and elsewhere in the instant specification denote alkyl groups containing from 1 to 6 carbon atoms, inclusive, such as methyl, ethyl, propyl, isopropyl, butyl, isobutyl, t-butyl, pentyl, amyl, hexyl, and the like.

The term "conventional hydrolyzable ester" as used herein denotes those hydrolyzable ester groups conventionally employed in the steroid art, preferably those derived from hydrocarbon carboxylic acids or phosphoric acids and their salts. The term "hydrocarbon carboxylic acid" defines both substituted and unsubstituted hydrocarbon carboxylic acids. These acids can be completely saturated or possess varying degrees of unsaturation (including aromatic), can be of straight chain, branched chain, or cyclic structure, and preferably contain from 1 to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical conventional hydrolyzable esters thus included within the scope of the term and the instant invention are acetate, propionate, butyrate, valerate, caproate, enanthate, caprylate, pelargonate, acrylate, undecanoate, phenoxyacetate, benzoate, phenylacetate, diphenylacetate, diethylacetate, trimethylacetate, t-butylacetate, trimethylhexanoate, methylneopentylacetate, cyclohexylacetate, cyclopentylpropionate, adamantoate, glycolate, methoxyacetate, hemisuccinate, hemiadipate, hemi-β,β-dimethylglutarate, acetoxyacetate, 2 - chloro - 4 - nitrobenzoate, aminoacetate, diethylaminoacetate, piperidinoacetate, β-chloropropionate, trichloroacetate, β-chlorobutyrate, dihydrogen phosphate, dibenzyl phosphate, benzyl hydrogen phosphate, sodium benzyl phosphate, cyclohexylammonium benzyl phosphate, sodium phenyl phosphate, sodium ethyl phosphate, di-p-nitrobenzyl phosphate, sodium o-methoxyphenyl phosphate, cyclohexylammonium p-cyanobenzyl phosphate, sodium phenacyl phosphate, benzyl o-carbomethoxyphenyl phosphate, and the like.

By the term "aryl" is included aryl, aralkyl, and alkaryl groups, such as phenyl, p-chlorophenyl, p-methoxyphenyl, benzyl, phenethyl, tolyl, ethylphenyl, and the like. The wavy line ($\int$) designates and includes both the alpha and beta configurations.

The novel 4'-(lower)alkoxytetrahydropyran-4'-yloxy ethers of this invention have high oral anti-fertility and estrogenic activity. These compounds can be used parenterally in the same manner and dosage as estradiol and when administered orally are used in the same manner as ethynylestradiol. The compounds of this invention can be administered in any of the number of conventional pharmaceutical forms, and particularly in ones suited for oral administration, e.g. in solid form, such as in pills, powders, capsules, tablets, or the like, or in liquid form, such as syrups, emulsions, suspensions, and the like.

The preferred compounds of this invention are 17β-(4'-loweralkoxytetrahydropyran-4'-yl) ethers of esterogenic steroids and particularly the ethers of secondary 17β-hydroxy groups, for example, the 17β-(4'-methoxytetrahydropyran-4'-yl) ethers of natural esterogenic compounds, such as estradiol. Prior to this invention, one of the most effective estrogenic agents was estradiol, the natural hormone, but because the agent has a very lower oral activity, its use by other than parenteral routes was impractical. Previously known orally active esterogenic agents are forms of compounds having structures completely different from estradiol (e.g. ethynylestradiol) and do not provide a natural hormone, such as estradiol, to the body. In contrast, the orally active 17β-(4'-methoxytetrahydropyran-4'-yloxy)estra-1,3,5(10)-trien-3-ol is a form of the natural hormone estradiol and introduces estradiol into the body when taken orally.

In anti-fertility rat assays by the procedure described by Kincl, F. A. and Dorfman, R. I., Journal of Reproduction and Fertility, 10, 105 (1965) (with the modification of using sesame oil rather than an aqueous vehicle) a daily oral dose of less than 6.2 µg. of 17β-(4'-methoxytetrahydropyran-4'-yloxy)estra-1,3,5(10)-trien-3-ol provides 100% inhibition; an oral dose of at least from 200–400 µg. of estradiol is required to provide the same effect, demonstrating the far greater efficiency of 17β-(4'-methoxytetrahydropyran-4'-yloxy)estra-1,3,5(10)-trien-3-ol as an orally active source of estradiol.

Estrogenic assays by the procedure described by Dorfman, R. I. and Dorfman, A. S., Endocrinology, 55, 65 (1964) (with the modification of using corn oil rather than an aqueous vehicle and conducting treatment for three rather than four days) show the following oral activities of 17β-(4'-methoxytetrahydropyran-4'-yloxy) estra-1,3,5(10)-trien-3-ol in comparison to estradiol.

| Agent: | Mean uterine ratio | Total dose, µg. |
|---|---|---|
| Control | 44±.02 | 0 |
| B | .56±.04 | 0.5 |
| A | .67±.04 | 0.2 |
| B | .94±.15 | 1.0 |
| A | 1.11±.08 | 0.4 |
| B | 1.11±.10 | 2.0 |
| A | 1.48±.13 | 0.8 |
| B | 1.50±.14 | 4.0 |
| A | 2.16±.10 | 1.6 |

This data shows that 17β-(4'-methoxytetrahydropyran-4'-yloxy)estra-1,3,5(10)-trien-3-ol is about 500% more effective than estradiol as an oral estrogen. The oral anti-fertility activity of 17β-(4'-methoxytetrahydropyran-4'-yloxy) estra-1,3,5(10)-trien-3-ol is even more remarkable, the oral effectiveness being at least 32 times the oral effectiveness of estradiol.

The novel steroidal 4'-(lower)alkoxytetrahydropyran-4'-yl ethers of this invention are prepared by reacting the steroid nucleus having a reactive hydroxyl group at one or more of the 3 and 17β positions (depending upon the particular steroid nucleus) with an excess of a 4'-(lower) alkoxy-5',6'-dihydro-2H-pyran. Free hydroxyl-containing parent compounds which are stable under acidic conditions can be reacted under substantially anhydrous conditions with an excess of the alkoxy dihydropyran in the presence of a small amount of an acidic catalyst, for example, hydrogen chloride, p-toluenesulfonic acid, boron trifluoride etherate, and the like, either alone or together with an inert, organic solvent, such as benzene, diethyl ether, methylene chloride or the like, at a temperature of from 0° C. to about 50° C., and preferably at room temperature (about 25° C.) for from about one to about 72 hours. When the free hydroxyl-containing parent compound is unstable under acidic conditions, such as allylic hydroxy steroids and estra-1,3,5(10),7-tetraenes, the reaction is preferably carried out in the presence of a sulfonyl halide rather than one of the above acidic catalysts. For this alternative reaction, any stable sulfonyl halide may be used as the catalyst, especially p-toluenesulfonyl chloride, benzene sulfonyl chloride, p-nitrobenzene sulfonyl chloride, and the like. The reaction is carried out using a large excess of the dihydropyran such as, for example, from about ten to 25 parts (molar ratios or parts by weight or volume) either alone or in the presence of a co-solvent, such as benzene, dioxane, diethyl ether, methylene chloride, and the like, in the presence of a catalytic amount of the sulfonyl halide such as, for example, from about 0.001 to 0.1 mole equivalents of sulfonyl halide per mole equivalent of dihydropyran. The alkoxytetrahydropyranyl ether steroid is then isolated in a conventional manner. For example, after the reaction is complete, the reaction mixture is treated with a small amount of pyridine and then poured into a dilute 10% aqueous sodium bicarbonate solution with stirring, and the product is isolated by extraction with an organic solvent immiscible with water, for example, diethyl ether, methylene chloride, hexane, and the like. The organic extract is concentrated by removing the organic solvent under reduced pressure at a temperature of less than 40° C. The ether product may be purified by crystallization or by chromatography on neutral alumina, for example.

The 4'-(lower) alkoxy-5',6'-dihydro-2H-pyran reactants used to form the ethers of this invention can be prepared by well-known methods. For example, tetrahydro-4-pyrone can be reacted with a primary or secondary lower alkanol under acidic conditions to form the intermediate, 4',4' - di (lower) alkoxytetrahydropyran, which upon distillation with an acid such as toluenesulfonic acid or mesitylenesulfonic acid, yields the 4'-(lower) alkoxy-5(,5'-dihydro-2H-pyran product. Such a method is described by Reese et al., J. Am. Chem. Soc. 89, 3367 (1967). The lower alkanol is preferably methanol but it can be other lower alcohols, such as ethanol, propanol, ispropanol, butanol, isobutanol, pentanol, amyl alcohol, hexanol, and the like, to form the corresponding pyrans such as, for example, 4'-methoxy-5',6'-dihydro-2H-pyran, 4'-ethoxy-5',6-hydro-2H-pyran, etc.

The novel estrogen steroid ethers of Formula I can be prepared by processes which can be illustrated schematically as by the flow chart in cols. 5 and 6.

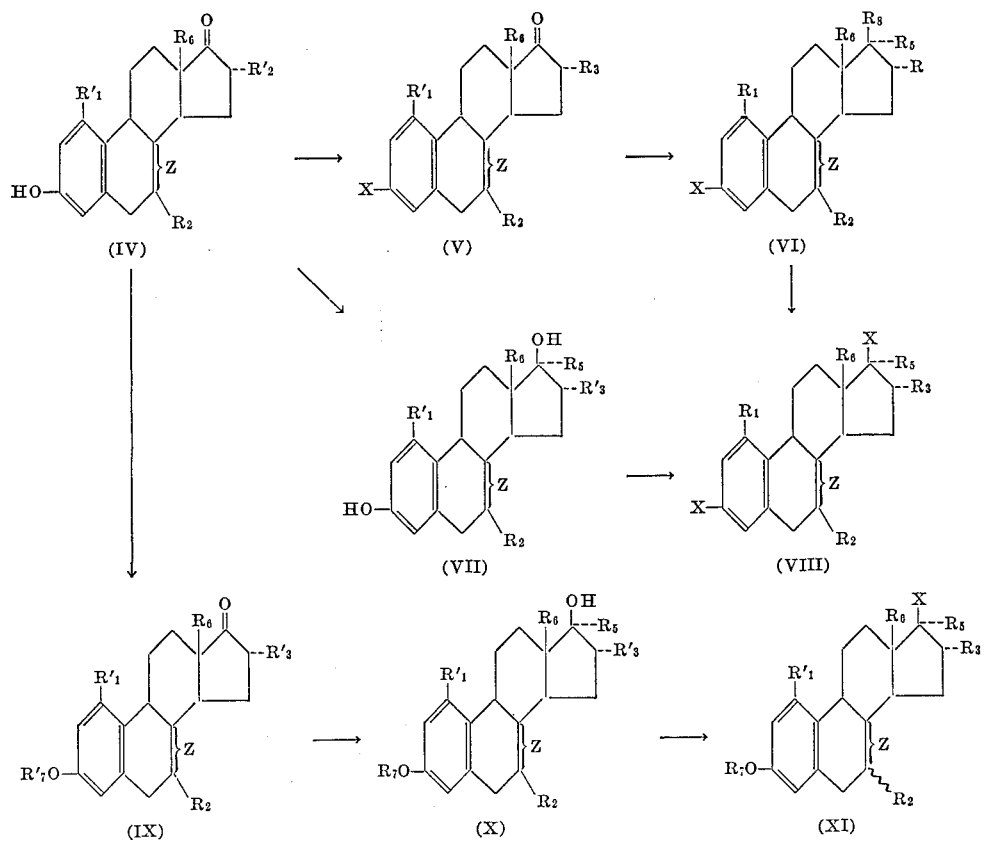

In the above formulas, $R'_1$ is hydrogen, methyl or a conventional hydrolyzable ester group; $R'_3$ is hydrogen or a conventional hydrolyzable ester group if Z is a single bond and is hydrogen if Z is a double bond; and $R_1$, $R_2$, $R_3$, $R_5$, $R_6$, X and Z have the sam meaning as set forth hereinabove for Formula I. $R'^7$ is an alkyl or cycloalkyl group, preferably methyl or cyclopentyl; $R_7$ is an acyl group having from 1 to 12 carbons such as acetyl or a lower alkyl or lower cycloalkyl group such as methyl or cyclopentyl; and $R_8$ is hydroxy or a conventional hydrolyzable ester thereof.

In carrying out the above illustrated process, to form the ether at C–3 (Formula VI), the compounds of Formula IV are reacted with a 4'-alkoxy-5',6'-dihydro-2H-pyran in the presence of an acidic catalyst to form the 3-(4'-alkoxytetrahydropyranyl) ethers of Formula V. Protecting groups can then be removed from C–1 or C–16α-hydroxy groups, if desired. This 17-ketone can then be converted to the corresponding 17α-unsubstituted-17β-hydroxy derivative (VI: $R_5$=H and $R_8$=hydroxy) or to the corresponding 17α-(lower alkyl, lower alkenyl, or lower alkynyl-17β-hydroxy derivative (IV: $R_5$=lower alkyl, lower alkenyl, or lower alkynyl and $R_8$=hydroxy) by conventional methods. When desired, selective esterification or etherification can then be used to form the respective groups from liberated, reactive hydroxyls by conventional procedures.

When the 17α-unsubstituted derivatives are desired, the 3 - (4'- alkoxytetrahydropyran - 4' - yloxy) - 17 - one (V) can be dissolved in an inert organic solvent, for example, a lower alkanol, such as methanol, an ether, such as dioxane or tetrahydrofuran, or the like, and reacted under neutral conditions with a metal hydride, for example, lithium aluminum hydride, sodium borohydride, and the like, at a temperature ranging from room temperature to reflux temperature for from about one to 24 hours, thus giving the corresponding 17α-unsubstituted-17β - ol (VI), e.g. 3 - (4' - methoxytetrahyrdopyran - 4' - yloxy)-1,3,5(10)-estratrien-17β-ol (VI: $R_1$, $R_3$ and $R_5$= hydrogen; $R_6$=methyl; and $R_8$=hydroxy). This is reaction also cleaves acetoxy groups.

When the 17α - (lower)alkyl, - (lower)alkenyl or -(lower)alknyl derivatives are desired, the 3'-(4'-tetrahydropyran-4'-yloxy)-17-one (V) can be refluxed in thiophene-free benzene under substantially anhydrous conditions, with a lower alkyl, lower alkenyl, or lower alkynyl magnesium halide, such as methyl, vinyl, or ethynyl magnesium bromide, or the like, for about three hours or longer, thus giving the corresponding 17α-(lower alkyl, lower alkenyl, or lower alkynyl)-17β-ol (VI), e.g. 3-(4'-methoxytetrahydropyran - 4' - yloxy) - 17α - methyl (-vinyl or -ethynyl)-estra-1,3,5(10)-trien-17β-ol (VI: $R_1$, $R_2$ and $R_3$=hydrogen; $R_5$=methyl, vinyl, or ethynyl, respectively; $R_6$=methyl; and $R_8$=hydroxy). This reaction also cleaves ester groups in the molecule.

Similarly, 3-(4' - (lower)alkoxytetrahydropyran - 4'-yloxy)-17-one (V) dissolved in absolute diethyl ether can be reacted under an inert nitrogen atmosphere with a lower alkyl, alkenyl, or alkynyl lithium compound, such as ethyl lithium, vinyl lithium, ethyanyl lithium, or the like, for 48 hours or longer at room temperature to provide the corresponding 17α-(lower alkyl, lower alkenyl, or lower alkynyl)-17β-ol (VI). The 3-(4'-tetrahydropyran-4'-yloxy)-17-one can also be dissolved in anhydrous benzene containing potassium t-amylate and reacted under an inert nitrogen atmosphere with gaseous acetylene at room temperature for 40 hours or longer to give the corresponding 17α-ethynyl-17β-ol (VI), which can then be hydrogenated in a known manner to give the corresponding 17α-vinyl or 17α-ethyl derivatives.

When the 17α-monohaloalkylnyl-17β-hydroxy derivatives are desired, a 1,2-dihaloethylene, with at least one of the halogens being other than fluorine (such as 1-chloro-2-fluoroethylene, 1,2-dichloroethylene, or 1,2-dibromoethylene) dissolved in anhydrous diethyl ether, is slowly admixed at 0° C., under an inert nitrogen atmosphere with a solution of methyl lithium in anhydrous diethyl ether (prepared, for example, by adding lithium to methyliodide in anhydrous diethyl ether solution under an inert nitrogen atmosphere at about 10° C.). This mixture is then held at room temperature, with stirring, for from about 90 minutes to about 12 hours, following which the steroid ether (VI), such as 3-(4'-methoxytetrahydropyran - 4' - yloxy)-estra-1,3,5(10)-trien-17-one (V: $R_1$, $R_2$ and $R_3$=hydrogen; $R_6$=methyl), is slowly added, and this reaction mixture is held at room temperature for from about 12 hours to about 18 hours to give the corresponding 17α-haloethynyl-17β-ol (VI). When 1-chloro-2-fluoroethylene is used, a 17α-fluoroethynyl substituent is obtained, 1,2-dichloroethylene gives a 17α-chloroethynyl substituent and 1,2-dibromoethylene gives a 17α-bromoethynyl substituent.

A 17α-trifluoropropynyl substituent can be introduced by reacting the 3-(4'-(lower)alkoxytetrahydropyran-4'-yloxy)-17-one with trifluoropropynylmagnesium bromide (prepared by reacting trifluoromethyl acetylene with ethylmagnesium bromide under standard Grignard conditions) in an inert organic solvent, preferably a mixture of diethyl ether and tetrahydrofuran or tetrahydropyran, under substantially anhydrous conditions at room temperature for from about 16 hours to about 24 hours or longer.

A 17α-(2",2"-difluorocyclopropenyl) group can be introduced by reacting the 17α-ethynyl compound, prepared by an above procedure, with sodium chlorodifluoroacetate, for example, in anhydrous diglyme, at 60° C. under an inert atmosphere for about 80 minutes. Conventional hydrolyzable esters at C–17β can be prepared from the 17β-ols by conventional procedures.

Each of the thus obtained 17α-unsubstituted-17β-ols and 17α-(lower alkyl, lower alkenyl, or lower alkynyl)-17β-ols corresponding to Formula VI, when reacted with an excess of 4'-(lower)alkoxydihydro-2H-pyran in the manner described hereinabove gives the corresponding 3,17β - bis(4' - alkoxytetrahydropyran-4'-yloxy) steroid (VIII), for example, 3,17β-bis(4'-methoxytetrahydropyran-4'-yloxy)-17α - ethynylestra - 1,3,5(10) - triene (VIII: $R_1$, $R_2$ and $R_3$=hydrogen; $R_5$=ethynyl; and $R_6$=methyl).

Alternatively, estrone or its derivatives (IV) can be first converted to the corresponding 17α-unsubstituted-17β-hydroxy derivative (VII: $R_5$=hydrogen) or to the corresponding 17α-lower alkyl, lower alkenyl, or lower alknyl)-17β-hydroxy derivative (VII: $R_5$=lower alkyl, lower alkenyl, or lower alkynyl) by the above described conventional methods.

Reactive hydroxy groups, if any, present at positions other than C–3 and C–17β in the steroid molecule can be protected or converted to desired esters or ethers by selective esterification or etherification by conventional procedures. For example, these groups can be acylated with a molar insufficiency of acetic anhydride to form a mixture of acetoxy compounds from which the desired free hydroxy compounds can be separated by conventional chromatography. Back hydrolysis of the acylated compounds can also be used to free the more reactive hydroxyl groups before chromatographic separation to increase the yield of desired products. The dihydroxy compound (VII) can then be reacted with an excess of the 4'-(lower)alkoxy-dihydro-2H-pyran in the presence of suitable catalyst as above described to form the corresponding 3,17β-di(4' - lower-alkoxytetrahydropyran-4'-yloxy) compounds of Formula VIII. For example, estra-1,3,5(10)-trien-3-ol-17-one can be refluxed in thiophene-free benzene under substantially anhydrous conditions with ethynyl magnesium halide to give the corresponding 17α-ethynylestra- - 1,3,5(10)-triene-3,17β-diol; this product when reacted with 4'-methoxydihydro-2H-pyran, for example, in the presence of p-toluenesulfonic acid forms 3,17β-bis(4'-methoxytetrahydropyran - 4' - yloxy) - 17α- ethynylestra-1,3,5(10)-triene (VIII: $R_1$, $R_2$ and $R_3$=hydrogen; $R_5$=ethynyl; and $R_6$=methyl).

Alternatively, estrone or its derivatives of Formula IV can first be etherified at position C–3 by conventional techniques. For example, etherification can be accomplished by treating the 3-hydroxy steroid with sodium hydride and then cyclopentyl bromide in benzene with refluxing to form the 3-cyclopentoxy derivative or by reacting the 3-hydroxy steroid in a potassium hydroxide ethanol solution containing dimethyl sulfate followed by neutralization with acetic acid to form the 3-methoxy derivative. The products (IX) can then be converted to the corresponding 17α-unsubstituted-17β-hydroxy derivative (X: $R_5$=hydrogen) or to the corresponding 17α-(lower alkyl, lower alkenyl, or lower alkynyl)-17β-hydroxy derivative ($X_5$=lower alkyl, lower alkenyl, or lower alknyl) by the above described conventional methods.

Alternatively, the 17β-hydroxy compounds of Formula VII can be acylated to protect free hydroxy groups at C–3 and C–16 (if the latter are present) by conventional techniques with back hydrolysis and chromatographic separation of mixed esters when needed. For example, acylation can be obtained upon treatment with an appropriate acylating agent, such as acetic or other anhydride in pyridine to provide the corresponding acetylated products represented by Formula X.

The 17β-hydroxy compounds represented by Formula X can then be reacted with an excess of 4'-(lower)alkoxy-dihydro-2H-pyran in the presence of an acidic catalyst to form the corresponding 17β-(4'-loweralkoxytetrahydropyran-4'-yloxy) steroids represented by Formula XI. For example, estra-1,3,5(10)-trien-3-ol-17-one can be etherified to 3 - methoxyestra - 1,3,5(10) - trien - 17 - one (IX: $R_7$=methyl); reduced with sodium borohydride in aqueous tetrahydrofuran to 3-methoxyestra-1,3,5(10) - trien-17β-ol (X: $R_7$=methyl) and reacted with 4'-methoxy-5',6'-dihydro-2H-pyran to form 3-methoxy-17β-(4'-methoxytetrahydropyran-4'-yloxy) - estra - 1,3,5(10)-triene (XI). Alternatively, estra-1,3,5(10)-trien-3,17-diol (VII) can be acylated with a molar equivalent of acetic anhydride, forming a mixture of 3-acetoxy and 17β-acetoxy compounds. The 3-acetoxy component can be separated by conventional chromatography on neutral alumina, for example, and can then be reacted with 4'-ethoxydihydro-2H-pyran, for example, in the presence of an acidic catalyst, such as hydrochloric acid to form the corresponding 3-acetoxy-17β-(4'-ethoxytetrahydropyran-4'-ylxoy)-estra-estra-1,3,5(10)-triene (XI).

The ester groups in the compounds of Formulas V, VI, VIII and XI can then be hydrolyzed by conventional techniques to convert the ester groups(s) to the corresponding hydroxy group(s).

In reacting the C–3, C–17β and C–3,17β hydroxy compounds herein-disclosed with 4'-(lower)alkoxy-5',6'-dihydro-2H-pyran by the procedures described herein to form the 4'-(lower)alkoxytetrahydropyran-4'-yl ethers of this invention, a second series of ethers, that is, 5',6'-dihydro-2H-pyran-4'-yl ethers of the starting materials are also formed. This second series of ethers correspond to those represented by Formula I wherein X is the 5',6'-dihydro-2H-pyran-4'-yloxy group. Hydrocarbon solvents for the reaction medium, higher catalyst concentrations, and longer reaction times increase the yield of the 5',6'-dihydro-2H-pyran-4'-yloxy compounds; use of ether or tetrahydrofuran solvents, lower catalyst concentrations, and shorter reaction times increase the yield of the 4'-(lower)alkoxytetrahydropyran-4'-yloxy compounds. This second series of compounds can be separated from the reaction products by conventional chromatographic techniques.

These 5',6'-dihydro-2H-pyran-4'-yl ethers have high oral anti-fertility and estrogenic activity. These compounds can be used parenterally in the same manner and dosage as estradiol and when administered orally are used in the same manner as ethynylestradiol. They can be administered in any of the number of conventional pharmaceutical forms, and particularly in ones suited for oral administration, e.g. in solid form, such as in pills, powders, capsules, tablets, or the like, or in the liquid form, such as syrups, emulsions, suspensions, and the like.

Examples of suitable 5',6'-dihydro-2H-pyran-4'-yl ethers are 3-(5',6'-dihydro-2H-pyran-4'-yloxy)-estra-1,3,5(10)-trien-17-one, 3-(5',6'-dihydro-2H-pyran-4'-yloxy)-estra-1,3,5(10)-trien-17-β-ol, 3-(5',6'-dihydro-2H-pyran-4'-yloxy)-17α-ethynylestra-1,3,5(10)-trien-17β-ol, 3-(5',6'-dihydro-2H-pyran-4'-yloxy)-7α-methyl-17α-ethynylestra-1,3,5(10)-trien-17β-ol, 3-(5',6'-dihydro-2H-pyran-4'-yloxy)-17β-cyclopentoxy-estra-1,3,5(10)-trien-17β-ol, 3-(5',6'-dihydro-2H-pyran-4'-yloxy)-estra-1,3,5(10)-7-tetraen-17-one, 3,17β-bis(5',6'-dihydro-2H-pyran-4'-yloxy)-estra-1,3,5(10)-triene, 1,3-bis(5',6'-dihydro-2H-pyran-4'-yloxy)-17α-ethynyl-estra-1,3,5(10)-trien-17β-ol, 1,3-bis(5',6'-dihydro-2H-pyran-4'-yloxy)-17α-ethynyl-17β-acetoxyestra-1,3,5(10)-triene, 17β-(5',6'-dihydro-2H-pyran-4'-yloxy)-estra-1,3,5(10)-trien-3-ol, 17β-(5',6'-dihydro-4'-yloxy)-18-methylestra-1,3,5(10)-trien-3-ol, 3-cyclopentoxy-17β-(5',6'-dihydro-2H-pyran-4'-yloxy)-estra-1,3,5(70)-triene, 3-cyclopentoxy-17β-(5',6'-dihydro-2H-pyran-4'-yloxy)-18-methylestra-1,3,5(10)-triene, 3-acetoxy-17β-(5',6'-dihydro-2H-pyran-4'-yloxy)-estra-1,3,5(10)-triene, 3-tetrahydropyran-2'-yloxy-17β-(5',6'-dihydro-2H-pyran-4'-yloxy)-estra-1,3,5(10)-triene, 3-cyclopentoxy-17α-ethynyl-17β-(5',6'-dihydro-2H-pyran-4'-yloxy)-estra-1,3,5(10)-triene, 3-cyclopentoxy-17α-ethynyl-17β-(5',6'-dihydro-2H-pyran-4'-yloxy)-18-methylestra-1,3,5(10)-triene, 1,3-diacetoxy-17α-ethynyl-17β-(5',6'-dihydro-2H-pyran-4'-yloxy)-estra-1,3,5(10)-triene, 17α-ethynyl-17β-(5',6'-dihydro-2H-pyran-4'-yloxy)-estra-1,3,5(10)-triene-3,16α-diol, 17β-(5',6'-dihydro-2H-pyran-4'-yloxy)-estra-1,3,5(10)-7-tetraen-3-ol, and the like.

The starting materials used in the above illustrated process are known in the art or can be obtained by methods known in the art.

Referring to Formula IV, 1-methyl derivatives of estrone, such as 1-methylestra-1,3,5(10)-triene-3-ol-17-one have been disclosed in Tetrahedron, 3, 28 (1958). C–1 hydroxy and ester derivatives of estrone and methods for their preparation have been previously described in U.S. Pat. No. 2,861,086.

Estrone derivatives having C–7α methyl groups, such as 7α - methylestra - 1,3,5(10) - trien - 3-ol-17-one, and methods for their preparation have been described by Kalvoda et al., Helvetica Chimica Acta., 50, 281 (1967).

Estrone derivatives containing hydroxy or ester groups at C–16, such as estra-1,3,5(10)-triene-3,16α-diol-17-one and the corresponding 16α-esters, such as 16α-acetate, and methods for their preparation have been described by Leeds et al., Am. Soc. 76, 2943 (1954). The corresponding C–1 hydroxy substituted compounds, such as estra-1,3,5(10)-triene-1,3,16α-triol-17-one and the respective 1,16α-acetates, and methods for their preparation have been described in U.S. Pat. No. 3,024,256. Estrone derivatives containing a 1-methyl group in combination with a 16α-hydroxy or -ester group, such as 1-methylestra-1,3,5 (10)-triene-3,16α-diol-17-one, can be prepared from the corresponding 1-methyl estrone by the method described by Engelfried et al., Arznelmittelforschung, 11, 25 (1966), page 1518.

Estrone derivatives containing a C–18 methyl group, such as 8-methylestra-1,3,5(10)-trien-3-ol-17-one can be prepared by the procedure described by Smith et al., Experientia, vol. 19, pp. 394–396 (1953).

These and other starting materials represented by Formula IV can be prepared by total synthesis following the procedure described hereinafter.

PREPARATION $$\text{(A)} + \text{(B)} \longrightarrow \text{(C)}$$

In the above equation, the 1-vinyl-6-methoxy-1-tetralol and its C–3 and C–8 substituted counterparts can be prepared from the corresponding 6-methoxytetralone and its C–3 and C–8 substituted derivatives, all of which are known by the procedure described in articles by Ananchenko et al., Dokladii Akad. Nauk SSSR, 112, 1067 (1957) and Tetrahedron, 18, 1355 (1962).

The 2-methyl (or -ethyl) cyclopentane-1,3-dione represented by Formula B is well known and has been previously described by Smith et al., J. Chem. Soc., p. 4472 (1964).

In the above Formulas A, B and C, as well as in formulas appearing hereinafter, $R_1$, $R_2$ and $R_6$ have the meanings described with respect to Formula I hereinabove.

1-vinyl-6-methoxytetralol (112 g.) and 2-ethylcyclopentane-1,3-dione (80 g.) are refluxed for six hours in methanol (275 cc.) containing potassium hydroxide (0.3 g.). Most of the methanol is evaporated and ether-benzene (800 cc; 1:1) is added. The solution is washed successively with water, 5% aqueous sodium hydroxide solution, water and brine, and dried. The product is recrystallized from methanol (180 cc.) to give 2-ethyl-2-(1,2,3,4 - tetrahydro - 6 - methoxynaphth-1-ylidenethyl)-cyclopenta-1,3-dione. Concentrated hydrochloric acid (50 cc.) is added with stirring over one minute to the foregoing dione (120 g.) in ethanol (750 cc.) at 50°. After stirring for five minutes, warm (50° C.) cyclohexane (one liter) is added followed by water (350 cc.), and stirring continued for five minutes. The aqueous layer is extracted with cyclohexane and the combined organic solutions are washed, dried and evaporated. The residue is dissolved in hot ethanol (200 cc.) containing cyclohexane (20 cc.) and kept at 0° C. for 16 hours. The precipitate is filtered, dried, purified by percolation in cyclohexane-benzene (9:1) through florisil, and recrystallized from ethanol-cyclohexane (10:1) to give the ketone 3 - methoxy-18-methylestra-1,3,5(10),8,14-penten-17-one. This compound (670 g.) in benzene (2.15 l.) containing 2% palladised calcium carbonate (225 g.) is shaken with hydrogen until 57.64 l. have been absorbed (112 minutes). Filteration and evaporation gives a residue which is recrystallized from methanol to give a product (561.1 g.) 3 - methoxy - 18 - methylestra-1,3,5(10),8,(9)-tetraen-17-one.

The latter compound (16.8. g.) is added in portions with stirring to sodium borohydride (6 g.) in methanol (500 cc.) under reflux. The mixture boils spontaneously. Acetic acid (15 cc.) is added to the cooled solution, most of the solvent is evaporated, water is added, and the mixture is extracted with ethyl acetate. The product is recrystallized from acetonitrile to give 3-methoxy-18-methylestra-1,3,5(10),8-tetraen-17β-ol (13.8 g.) which is represented by Formula C above (where $R_1$ and $R_2$=hydrogen; $R_6$=ethyl).

Following the above procedure except replacing the 1-vinyl-6-methoxy-1-tetralol with tetralols substituted at the C-3 and C-8 positions, that is, 1-vinyl-3-methyl-6-methoxy - 1 - tetralol, 1-vinyl-3,8-dimethyl-6-methoxy-1-tetralol, 1-vinyl-6-methoxy-8-methyl-1-tetralol, 1-vinyl-6,8 - dimethoxy - 1 - tetralol and 1-vinyl-3-methyl-6,8-dimethoxy-1-tetralol, the corresponding C-1 and C-7 substituted 3-methoxy-18-methylestra-1,3,5(10), 8-tetraen-17β-ols are obtained, a 3-methoxy-7,18-dimethylestra-1,3,5(10), 8 - tetraen-17β-ol, 1,7,18-trimethyl-3-methoxyestra-1,3,5 (10),8-tetraen-17β-ol, 1,18-dimethyl-3-methoxyestra-1,3,5 (10),8-tetraen-17β-ol, 1,3-dimethoxy-18-methylestra-1,3,5 (10),8 - tetraen-17β-ol and 1,3-dimethoxy-7,8-dimethyl-estra-1,3,5(10),8-tetraen-17β-ol.

Similarly, by following the above procedures with each of the named or indicated 1-vinyl-6-methoxy-1-tetralols but replacing the 2-ethylcyclopentane-1,3-dione with 2-methylcyclopentane-1,3-dione, the corresponding 18-unsubstituted estra-1,3,5(10),8-tetraenes are formed, e.g. 3-methoxyestra - 1,3,5(10),8 - tetraen-17β-ol, 3-methoxy-7-methylestra - 1,3,5(10),8-tetraen-17β-ol, 1,7-dimethyl-3-methoxyestra - 1,3,5(10),8 - tetraen-17β-ol, 1-methyl-3-methoxyestra - 1,3,5(10),8-tetraen-17β-ol, 1,3-dimethoxy-estra-1,3,5(10),8-tetraen17β-ol and 1,3-dimethoxy-7-methylestra-1,3,5(10),8-tetraen-17β-ol.

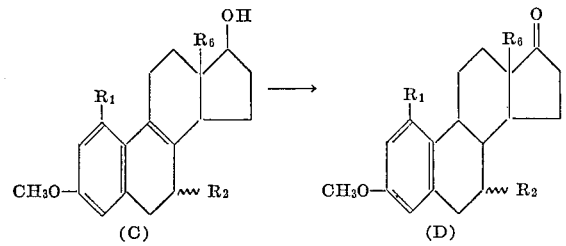

In the above formulas, C and D, $R_1$, $R_2$ and $R_6$ represent the same groups described with respect to Formula I hereinabove.

Lithium (6 g.) is added in portions with stirring to 3-methoxy-18-methylestra-1,3,5(10),8-tetraen - 17β - ol (16.8 g.) in liquid ammonia (400 cc.) -aniline (150 cc.) -tetrahydrofuran (50 cc.) After stirring for two hours, ammonium chloride (50 g.) and then water (600 cc.) are added, and the mixture is extracted with ether. The product, 3-methoxy-18-methylestra - 1,3,5(10) - trien-17β-ol, is recrystallized from hexane. To this compound (50 g.) in acetone (2 l.) containing anhydrous magnesium sulfate (60 g.) is added 8 N-chromic acid with stirring. The mixture is stirred for five minutes and propan-2-ol (200 cc.) and sodium hydrogen carbonate (100 g.) are added. The solids are filtered from the mixture and washed with hot chloroform. Evaporation of the combined filtrate and washings give a residue which is percolated in ether through a column of neutral alumina. Recrystallization of the product from methanol gives the ketone 3-methoxy-18-methylestra-1,3,5(10)-trien - 17 - one represented by Formula D. Following the same procedure but replacing the 3-methoxy-18-methylestra-1,3,5(10),8-tetraen-17β-ol with the corresponding compounds wherein $R_1$ is methyl or methoxy, $R_2$ is hydrogen or methyl, and $R_6$ is methyl or ethyl, the corresponding substituted 3-methoxyestra-1,3,5(10)-trien-17-ones are produced, e.g. 1,7(α or β)-dimethyl-3-methoxyestra - 1,3,5(10) - trien-17-one, 1,7 (α or β),18-trimethyl-3-methoxyestra - 1,3,5(10)-trien-17-one, 1,3-dimethoxyestra-1,3,5(10)-trien-17-one, 1,3-dimethoxy-7(α or β)-methylestra-1,3,5(10)-trien-17-one, 1,3-dimethoxy-7(α or β),18-dimethylestra-1,3,5(10)-trien- 17-one, 3-methoxy-7(α or β)-methylestra-1,3,5(10)-trien-17-one, 3-methoxy-7(α or β),18-dimethylestra-1,3,5(10)-trien-17-one, 3-methoxyestra-1,3,5(10)-trien-17-one, 3-methoxy-18-methylestra-1,3,5(10)-trien-17-one, 1,18-dimethyl - 3 - methoxyestra-1,3,5(10)-trien-17-one, and 1,3-dimethoxy-18-methylestra-1,3,5(10)-trien-17-one.

The 7α-methyl- and 7β-methyl substituted estra-1,3,5 (10)-trienes represented by Formula D ($R_2$=7α-methyl or 7β-methyl) can be separated from the mixtures of these isomers produced in the above method by alumina or silica gel chromatographic techniques to obtained pure isomers.

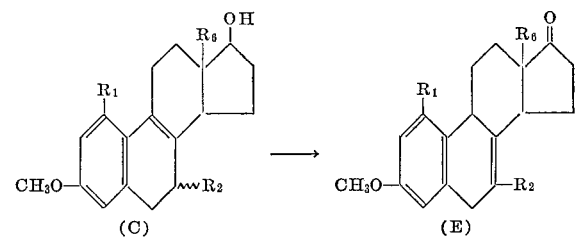

In Formulas C and E, $R_1$, $R_2$ and $R_6$ represent the same groups as in Formula I.

3-methoxy-18-methylestra-1,3,5(10),8-tetraen - 17β-ol (1 g.) is mixed with a benzene-hexane solution (1:1) of 1.15 equivalents of m-chloro perbenzoic acid at 0° C. The reaction mixture is allowed to stand for five hours at 0° C. and then washed with a sodium bicarbonate solution and water, dried and evaporated, giving a mixture of 3-methoxy - 8,9-oxo-18-methylestra-1,3,5(10)-trien-17β-ol and 3-methoxy - 18 - methylestra-1,3,5(10),9-tetraene-8α, 17β-diol. The mixture is added to a solution of benzoic acid and chloroform converting the mixture to a pure 3-methoxy - 18 - methylestra-1,3,5(10),9(11)-tetraene-8α,17β-diol. The reaction mixture is washed with sodium carbonate solution and water, dried and evaporated.

A solution of the last named compound (2 g.) in methanol (200 ml.) is added to a suspension of 5% palladium-on-carbon catalyst (0.5 g.) in methanol (50 ml.) which has been hydrogenated for 30 minutes, and hydrogenation with agitation is continued until the uptake of hydrogen has ceased. The catalyst is removed by filtration and the solution is evaporated to yield 3-methoxy-18-methylestra-1,3,5(10)-triene-8α,17β-diol which is recrystallized from methylene chloride:hexane for further purification. This compound (1 g.) is then refluxed with an excess of methanesulfonyl chloride in pyridine until the dehydration is complete. Water is added to the reaction mixture and it is extracted with chloroform; the chloroform solution is then evaporated to dryness. Refiltration of the product in benzene through florisil and recrystallization from methanol yields purified 3-methoxyestra-1,3,5(10),7-tetraene-17β-methylsulfonate.

A solution of the last named compound (1 g.) and tetrahydrofuran (50 ml.) is added over a 30 minute period to a stirred suspension of lithium aluminum hydride (1 g.) in anhydrous tetrahydrofuran (50 ml.), and this mixture is heated at reflux for two hours. To the mixture is cautiously added ethyl acetate (5 ml.) and water (2 ml.). Sodium sulfate is next added and the mixture is filtered; the solid thus collected is washed with hot ethyl acetate. The combined organic solutions are then evaporated to dryness and recrystallized from acetone:hexane to yield 3-methoxy-18-methylestra-1,3,5(10),7-tetraen-17β-ol.

To the Grignard reagent from magnesium (51 mg.) and methyliodide (0.16 cc.) in ether (3 cc.) is added this compound, and the mixture is heated in an oil bath at 160° C. for one and one-half hours. The cooled mixture is then treated with dilute acetic acid and ether and the latter is extracted thoroughly with 5% potassium hydroxide solution, yielding 18-methylestra-1,3,5(10,7-tetraene-3,17β-diol.

A solution of the last mentioned compound (1 g.) in xylene (30 ml.) and cyclohexanone (10 ml.) is distilled to remove moisture. A solution of aluminum isopropoxide (1 g.) in xylene (5 ml.) is added dropwise over five minutes to the slowly distilling solution, distillation being continued for an additional 45 minutes. The mixture is then cooled and diluted with water, a mixture of water and the solvents being removed by steam distillation. The resulting solid is collected by filtration through Celite diatomaceous earth and dried. This solid is extracted with hot acetone and recystallized from acetone to yield 18-methylestra-1,3,5(10),7-tetraen-3-ol-17-one represented by Formula E above.

Repeating the above procedure except for replacing the 3-methoxy-18-methylestra-1,3,5(10),8-tetraen-17β-ol with the corresponding substituted compounds wherein $R_1$ is methyl or methoxy, $R_7$ is hydrogen, α-methyl or β-methyl and $R_{18}$ is methyl or ethyl, and adjusting the concentrations of reactants to compensate for additional reactive groups (e.g. increasing the concentration of the Grignard reagent to cleave both the C-1 and the C-3 methoxy groups to the corresponding hydroxy groups), the corresponding substituted estra-1,3,5(10),7-tetraenes are produced, for example, 1-methylestra-1,3,5(10),7-tetraen-3-ol-17-one, 1,7-dimethylestra-1,3,5(10),7-tetraen-3-ol-17-one, 1,18 - dimethylestra - 1,3,5(10),7-tetraen - 3 - ol-17-one 1,7,18-trimethylestra-1,3,5(10),7-tetraen-3-ol-17-one, estra-1,3,5(10),7-tetraene-1,3-diol-17-one, 7-methylestra-1,3,5(10),7-tetraene-1,3-diol-17-one, 18-methylestra-1,3,5(10),7-tetraene-1,3-diol-17-one, 7,18-dimethylestra-1,3,5(10),7-tetraene-1,3-diol-17-one and 7,18-dimethylestra-1,3,5(10),7-tetraen-3-ol-17-one.

The invention is further illustrated by the following specific but non-limiting examples.

Example 1

Two milliliters of 4'-methoxy-5',6'-dihydro-2H-pyran are added to a solution of 1 g. of estra-1,3,5(10)-trien-3-ol-17-one in 15 ml. of benzene. About 1 ml. is removed by distillation to remove moisture and 0.4 g. of p-toluenesulfonic acid is added to the cooled solution. This mixture is allowed to stand at room temperature for four days and is then washed with aqueous sodium carbonate solution and water, dried and evaporated. The residue is chromatographed on neutral alumina, eluting with hexane, to yield 3 - (4' - methoxytetrahydropyran - 4' - yloxy)-estra-1,3,5 (10)-trien-17-one which is recrystallized from pentane.

Following the same procedure but replacing the 4'-methoxy-5',6'-dihydro-2H-pyran with 4'-ethoxy-5',6'-dihydro-2H-pyran, 4'-propoxy-5',6'-dihydro-2H-pyran, 4'-isopropoxy-5',6'-dihydro-2H-pyran, 4'-butoxy-5',6'-dihydro-2H-pyran, 4'-isobutoxy-5',6'-dihydro-2H-pyran, 4'-pentoxy - 5',6'-dihydro-2H-pyran, 4-'amyloxy-5',6'-dihydro-2H-pyran and 4'-hexoxy-5',6'-dihydro-2H-pyran, the corresponding 3 - (4' - loweralkoxytetrahydropyran-4'-yloxy) ethers are obtained, e.g. 3-(4'-ethoxytetrahydropyran-4'-yloxy)-estra - 1,3,5(10) - trien-17-one, 3-(4'-propoxytetrahydropyran - 4'-yloxy)-estra-1,3,5(10)-trien-17-one, 3 - (4'-butoxytetrahydropyran-4'-yloxy)-estra-1,3,5(10)-trien-17-one and 3-(4'-hexoxytetrahydropyran-4'-yloxy)-estra-1,3,5(10)-trien-17-one.

By repeating the above procedures with estra-1,3,5(10)-trienes having hydrogen, methyl, methoxy or hydrolyzable ester groups at C-1; hydrogen or methyl groups at C-7; hydrogen or ester groups at C-16; and hydrogen or methyl groups at C-18 yields the corresponding etherified products, e.g. 3-(4'-methoxytetrahydropyran-4'-yloxy)-7α - methylestra - 1,3,5(10)-trien-17-one, 3-(4'-methoxytetrahydropyran - 4'-yloxy) - 18 - methylestra-1,3,5(10)-trien-17-one, 1-methyl-3-(4'-methoxytetrahydropyran-4'-yloxy)-estra-1,3,5(10)-trien-17-one, 3-(4'-methoxy-tetrahydropyran - 4' - yloxy)-estra-1,3,5(10)-trien-16α-ol-17-one, and the like.

Repeating the above procedure except replacing estra-1,3,5(10)-trien-3-ol-17-one with extra-1,3,5(10)-triene-1,3-diol-17-one and using 4 ml. of 4'-methoxy-5',6'-dihydro-2H-pyran yields 1,3-bis(4'-methoxytetrahydropyran-4'-yloxy)-estra-1,3,5(10)-trien-17-one.

Example 2

Two milliliters of 4'-methoxy-5',6'-dihydro-2H-pyran are added to a solution of 1 g. of estra-1,3,5(10),7-tetraen-3-ol-17-one in 15 ml. of benzene. About 1 ml. is removed by distillation to removed moisture and 0.4 g. of p-toluenesulfonyl chloride is added to the cooled solution. This mixture is allowed to stand at room temperature for four days and is then washed with aqueous sodium carbonate solution and water, dried and evaporated. The residue is chromatographed on neutral alumina, eluting with hexane, to yield 3-(4'-methoxytetrahydropyran-4'-yloxy)-estra-1,3,5(10),7-tetraen-17-one which is recrystallized from pentane.

Following the same procedure but replacing the 4'-methoxy-5',6'-dihydro-2H-pyran with 4'-ethoxy-5',6'-dihydro-2H-pyran, 4'-propoxy-5',6'-dihydro-2H-pyran, 4'-isopropoxy - 5',6' - dihydro-2H-pyran,-4'-butoxy-5',6'-dihydro-2H-pyran, 4'-isobutoxy-5',6'-dihydro-2H-pyran, 4'-pentoxy - 5',6'-dihydro-2H-pyran, 4'-amyloxy-5',6'-dihydro-2H-pyran and 4'-hexoxy-5',6'-dihydro-2H-pyran, the corresponding 3 - (4' - loweralkoxytetrahydropyran-4'-yloxy) ethers are obtained, e.g. 3-(4'-ethoxy-tetrahydropyran-4'-yloxy)-estra - 1,3,5(10),7 - tetraen - 17-one, 3-(4'-propoxytetrahydropyran - 4' - yloxy)-estra-1,3,5(10),7-tetraen - 17 - one, 3-(4'-butoxytetrahydropyran-4'-yloxy)-estra - 1,3,5(10),7-tetraen-17-one and 3-(4'-hexoxytetrahydropyran-4'-yloxy)-estra-1,3,5(10),7-tetraen-17-one.

Products having other substituents at C-1, C-7, C-16 and C-18 as described with respect to Formula V are obtained from the corresponding Formula IV compounds by this procedure.

Example 3

A solution of 1 g. of 3-(4'-methoxytetrahydropyran-4'-yloxy)-estra-1,3,5(10)-trien-17-one in 50 ml. of tetrahydrofuran is added over a 30 minute period to a stirred suspension of 1 g. of lithium aluminum hydride in 50 ml. of anhydrous tetrahydrofuran and this mixture is heated at reflux for two hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 3-(4'-methoxytetrahydropyran - 4'-yloxy)-estra-1,3,5(10)-trien-17β-ol, which may be further purified through recrystallization from acetone:hexane.

Following the same procedure but replacing the 3-(4'-methoxytetrahydropyran-4' - yloxy) - estra - 1,3,5(10)-trien-17-one with the other estra-1,3,5(10)-trien-17-one products of Examples 1 and 2 having at 4' other lower alkoxy groups such as ethoxy, propoxy, butoxy, hexoxy, and the like; having at C-1 ($R'_1$) hydrogen, methyl or methoxy; at C-7 ($R_2$) α- or β-methyl when the bond between C-6 and C-7 is a single bond; C-16 ($R'_3$) is hydrogen or an ester group such as acetyloxy group; C-18 ($R_6$) is hydrogen or methyl; and the bond between C-7 and C-8 is a single or double bond gives the corresponding 17β-hydroxy products, e.g. 3-(4'-methoxytetrahydropyran-4'-yloxy) - 7α - methylestra-1,3,5(10) - trien-17β-ol, 3 -(4' - methoxytetrahydropyran-4'-yloxy)-16α-acetyloxyestra - 1,3,5(10 - trien - 17β-ol, 3-(4'-methoxytetrahydropyran - 4' - yloxy) - estra-1,3,5(10,7-tetraen-17β-ol, etc.

Example 4

A solution of one chemical equivalent of 3-(4'-methoxytetrahydropyran - 4' - yloxy) - estra - 1,3,5(10)-trien-17β-ol in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene over a period of 20 minutes. The mixture is allowed to reflux for 20 hours after which time the precipitate of sodium bromide is removed by filtration and the organic phase dried and evaporated to yield 3-(4'-methoxytetrahydropyran-4'-yloxy) - 17β - cyclopentoxyestra-1,3,5(10)-triene which is further purified upon recrystallization from pentane. Repeating this procedure with other products of Examples 1 and 2 yields the corresponding 17β-cyclopentoxy compounds.

A mixture of 3-(4'-methoxytetrahydropyran-4'-yloxy)-estra-1,3,5(10)-trien-17β-ol (0.32 g.) and cyclohexanone diethyl ketal (1.0 ml.) is heated at 130 to 140° C. for 30 minutes, then 175 to 180° C. for 15 minutes and finally at 180 to 185° C. for 30 minutes while distilling of the volatile ethanol. The reaction product is dissolved in benzene, purified by chromatography on alumina, and recrystallized from a mixture of ether, methanol, and pyridine to give 3-(4'-methoxytetrahydropyran-4-yloxy)-17β-cyclohexenyloxyestra-1,3,5(10)-trien. Repeating this procedure with other products of Example 3 yields the corresponding 17β-cyclohexenyloxy compounds.

Example 5

A mixture of 1 g. of 3-(4'-methoxytetrahydropyran-4'-yloxy)-estra-1,3,5(10)-trien-17β-ol, 4 ml. of pyridine, and 2 ml. of acetic anhydride is allowed to stand at room temperature for 15 hours. The mixture is then poured into ice water and the solid which forms is collected by filtration, washed with water, and dried to yield 3-(4'-methoxytetrahydropyran - 4' - yloxy) - 17β-acetoxyestra-1,3,5(10)-triene which may be further purified through recrystallization from acetone:hexane.

Following the same procedure, esters having hydrogen, methyl or methoxy groups at C–1 ($R'_1$); hydrogen or methyl groups at C–7 ($R_2$); hydrogen, methoxy or hydrolyzable esters at C–16α ($R'_3$); and hydrogen or methyl group at C–18 ($R_6$) are obtained from the corresponding 17β-hydroxy compounds produced in Example 3.

Example 6

To a solution of 5 g. of 3-(4'-methoxytetrahydropyran-4'-yloxy)-estera-1,3,5(10)-trien-17β-ol in 100 ml. of anhydrous benzene are added 1 g. of p-toluenesulfonic acid and 10 ml. of undecenoic anhydride. The mixture is allowed to stand for 24 hours at room temperature and poured with stirring into ice and water. The organic phase is separated, washed with 10% sodium carbonate solution and with water, dried and evaporated to yield 3-(4'-methoxytetrahydropyran - 4' - yloxy) - 17β-undecenoyloxyestra-1,3,5(10)-triene which is further purified through recrystallization from ether:hexane.

Following the same procedure using other acid anhydrides, such as butanoic anhydride, heptanoic anhydride, etc., the corresponding esters having two are more carbons in the ester group are formed, e.g. 3-(4'-methoxytetrahydropyran - 4' - yloxy) - 17β-heptanoyloxyestra-1,3,5(10)-triene, and the like are formed. Similarly, estra-1,3,5(10-triene-17β-ols having groups at C–1, C–7, C–16 and C–18 as indicated in Formual VI (products of Examples 3) are converted to the corresponding 17β-esters by this procedure.

Example 7

A solution of 1 g. of 3-(4'-methoxytetrahydropyran-4'-yloxy)-estra-1,3,5(10),7-tetraen-17β-ol in 60 ml. of anhydrous ether is treated with 7.5 molar equivalents of ethylmagnesium bromide in ether and, after a few minutes, with 7.5 molar equivalents of acetyl chloride. The mixture is allowed to stand at room temperature for 15 hours, then diluted with water, and extracted with methylene chloride. The extracts are washed with water to neutrality, dried and evaporated. The residue is chromatographed on neutral alumina, eluting with ether: hexane, to yield 3-(4-methoxytetrahydropyran-4'-yloxy)-17β-acetoxyestra-1,3,5(10),7-tetraene which is recrystallized from acetone:hexane.

Following the same procedure using other acid chlorides, estra - 1,3,5(10) - trien - 17β - ols and/or estra-1,3,5(10),7-tetraen-17β-ols having group at C–1, C–7, C–16 and C–18 as indicated in Formula VI are converted to the corresponding 17β-esters.

Example 8

Following the procedures of Example 1 but replacing estra-1,3,5(10)-trien - 3 - ol-17-one with 3-(4'-methoxytetrahydropyran - 4' - yloxy)-estra-1,3,5(10)-trien-17β-ol, 3,17β-bis(4' - methoxytetrahydropyran - 4'-yloxy)-estra-1,3,5(10-triene is obtained.

Following the procedures of Example 2 but replacing estra-1,3,5(10),7-tetraen-3-ol-17-one with 3-(4'-methoxytetrahydropyran - 4' - yloxy) - estera-1,3,5(10),7-tetraen-17β-ol yields the corresponding 3,17β-bis(4'-methoxytetrahydropyran-4'-yloxy_-estra-1,3,5(10),7-tetraene.

Similarly, other 3,17β-bis(4'-alkoxytetrahydropyran-4'-yloxy) ethers are obtained from other 4'-alkoxy-5',6'-dihydro-2H-pyrans. Substituting other estra-1,3,5(10)-trien-17β-ols and estra-1,3,5(10),7-tetraen-17β-ols having substituents at C–1, C–7, C–16 and C–18 as indicated in Formula VI (with reactive hydroxyl groups other than at C–3 and C–17β being suitably protected) yields the corresponding substituted 3,17β-bisethers (compounds of Formula VIII).

Example 9

A solution of 5 g. of 3-(4'-methoxytetrahydropyran-4'-yloxy)-estra-1,3,5(10-trien-17 - one in 250 ml. of thiophene-free benzene is treated with an equimolar amount of methylmagnesium bromide in anhydrous ether. The mixture is heated at reflux under anhydrous conditions for three hours, cooled and cautiously treated with excess aqueous ammonium chloride solution. This mixture is then extracted with ethyl acetate and these extracts are in turn washed with water, dried over sodium sulfate, and evaporated to dryness to yield 3-(4'-methoxytetrahydropyran - 4' - yloxy)-17α-methylestra-1,3,5(10)-trien-17β-ol which is recrystallized from methylene chloride:hexane.

Repeating the procedure with other lower alkylmagnesium bromides, such as ethyl magnesium bromide, propylmagnesium bromide, butylmagnesium bromide, amylmagnesium bromide and hexylmagnesium bromide, yields the corresponding 17α-ethyl, 17α-propyl, 17α-butyl, 17α-amyl and 17α-hexyl compounds. Repeating the procedure with other products of Examples 1 and 2 yields the corresponding 17α-lower alkyl compounds.

Example 10

Following the procedure of Example 5 but replacing the methylmagnesium bromide with vinylmagnesium bromide yields 3-(4'-methoxytetrahydropyran-4'-yloxy)-17α-vinylestra-1,3,5(10)-trien-17β-ol. Other lower alkenylmagnesium bromides, such as 1'-propenyl, 2'-propenyl, 1'-butenyl, 2'-butenyl, and the like, magnesium bromides, yield the corresponding lower alkenyl products. Similarly, other products of Examples 1 and 2 yield the corresponding 17α-lower alkenyl compounds by this procedure.

Example 11

To a solution of 1 g. of lithium aluminum hydride in 100 ml. of anhydrous tetrahydrofuran is continuously bubbled a slow current of purified acetylene for one hour. Thereafter, 1 g. of 3 - (4'-methoxytetrahydropyran-4'-yloxy)-estra-1,3,5(10)-trien-17-one in 10 ml. of tetrahydrofuran is added and the reaction mixture stirred at room temperature for four hours. Eight milliliters of water are then added and the mixture stirred for 30 minutes. The mixture is then filtered and the organic filtrate evaporated to yield 3 - (4'-methoxytetrahydropyran-4'-yloxy)-17α-ethynylestra-1,3,5(10)-trien-17β-ol which is recrystallized from acetone:hexane.

Following the same procedure, 3-(4'-methoxytetrahydropyran-4'-yloxy)-17α-ethynyl-18-methylestra-1,3,5(10)-trien-17β-ol, 1 - methyl-3-(4'-methoxytetrahydropyran-4'-yloxy) - 17α - ethynylestra-1,3,5(10)-trien-17β-ol, 3-(4'-methoxytetrahydropyran - 4'-yloxy)-7α-methyl-17α-ethynylestra-1,3,5(10)-trien-17β-ol and 3-(4'-methoxytetrahydropyran-4'-yloxy)-17α-ethynylestra-1,3,5(10),7 - tetraen-17β-ol, for example, are obtained from the corresponding 17-ketones. Similarly, other 17α-ethynyl-17β-ols having groups at C–1, C–7, C–16 and C–18 as indicated with respect to Formula VI can be prepared from the corresponding 17-ketone products of Examples 1 and 2, e.g. 1,3 - bis(4' - methoxytetrahydropyran - 4'-yloxy)-17α-ethynylestra-1,3,5(10)-trien-17-ol, etc.

Example 12

To a refluxing solution of 6.2 g. of 3-(4'-methoxytetrahydropyran - 4' - yloxy) - 17α-ethynyl-17β-acetoxyestra-1,3,5(10)-triene in 15 ml. of anhydrous diglyme, there is added dropwise over a period of about 80 minutes a heated (about 60° C.) solution of 20.72 g. of sodium chlorodifluoroacetate in 50 ml. of anhydrous diglyme under nitrogen with stirring. After all the sodium chlorodifluoroacetate is added, the reaction mixture is cooled and filtered. The filtrate is evaporated to dryness to reduced pressure. The residue is dissolved in hexane and chromatographed on 300 g. of Florisil (synthetic magnesium silicate), eluting with hexane:ether, to furnish 3–(4' - methoxytetrahydropyran - 4'-yloxy)-17α-(2'',2''-difluorocyclopropenyl)-17β-acetoxyestra-1,3,5(10)-triene.

Following the same procedure but replacing the 3-(4'-methoxytetrahydropyran - 4'-yloxy)-17α-ethynyl-17β-acetoxyestra - 1,3,5(10)-triene with the corresponding compounds having other substituents at C–1, C–7, C–16 and C–18 as described with respect to Formula VI (products of Example 11) yields the corresponding 17α-(2'',2''-difluorocyclopropenyl) products.

Example 13

Following the procedure of Example 7 but replacing 3-(4' - methoxytetrahydropyran-4'-yloxy)-estra-1,3,5(10), 7-tetraen-17β-ol with 3 - (4'-methoxytetrahydropyran-4'-yloxy) - 17α - ethynylestra-1,3,5(10)-trien-17β-ol and 3-(4' - methoxytetrahydropyran-4'-yloxy)-17α-ethynylestra-1,3,5(10),7-tetraen-17β-ol, the corresponding 17β-acetates are obtained, e.g. 3 - (4'-methoxytetrahydropyran-4'-yloxy)-17α-ethynyl-17β-acetoxyestra-1,3,5(10) - triene and 3-(4'-methoxytetrahydropyran-4'-yloxy)-17α-ethynyl-17β-acetoxyestra-1,3,5(10),7-tetraene.

Following the same procedure using other acid chlorides and/or 17β-ols having groups at C–1, C–7, C–16 and C–18 as indicated in Formula VI are converted to the corresponding 17β-esters, e.g. 1,3 - bis(4'-methoxytetrahydropyran-4'-yloxy)-17α-ethynyl-17β - acetoxyestra-1,3,5(10)-triene, etc. When reactive hydroxy groups other than at 17β are present, the diacetyl products are obtained with a corresponding molar excess of reactants; the monoacetyl products are formed by using a corresponding molar concentration of reactants and separating the desired products by conventional chromatography from the ester mixture formed.

Example 14

Following the procedures of Example 1 but replacing estra-1,3,5(10)-trien-3-ol-17-one with 3-(4'-methoxytetrahydropyran - 4' - yloxy)-17α-ethynylestra,1,3,5(10)-trien-17β-ol, 3,17β - bis(4'-methoxytetrahydropyran-4'-yloxy)-17α-ethynylestra-1,3,5(10)-triene is obtained.

Following the procedures of Example 2 but replacing estra - 1,3,5(10),7 - tetraen - 3 - ol - 17-one with 3-(4'-methoxytetrahydropyran - 4' - yloxy) - 17α - ethynylestra-1,3,5(10),7 - tetraen-17β-ol yields the corresponding 3, 17β - bis(4'-methoxytetrahydropyran-4'-yloxy)-17α-ethynylestra-1,3,5(10),7-tetraene.

Similarly, other 3,17β-bis(4'-alkoxytetrahydropyran-4'-yloxy) ethers are obtained from other 4'-alkoxy-5',6'-dihydro-2H-pyrans. Substituting other estra-1,3,5(10)-trien-17β-ols and estra-1,3,5(10),7-tetraen-17β-ols at C–1, C–7, C–16 and C–18 as indicated in Formula VI (products of Examples 3, 4 and 9-11 with reactive hydroxyl groups other than at C–17β suitably protected) yields the corresponding substituted 3,17β-bisethers (compounds of Formula VIII).

Example 15

A solution of 8.5 g. of 1,2-dichloroethylene in 50 ml. of anhydrous ether is added in a dropwise fashion under nitrogen and at 0° C. over a 30 minute period to a stirred solution of 15 ml. of 1.4 N methyl lithium in anhydrous ether. After stirring for an additional 90 minutes at room temperature, a solution of 0.5 g. of 3-(4'-methoxytetrahydropyran-4'-yloxy)-estra - 1,3,5(10)-trien-17-one in 20 ml. of anhydrous ether is added in a dropwise fashion with stirring over a 15 minute period. Stirring at room temperature is continued for 18 hours and the reaction mixture is then poured into ice water and extracted with ether. These extracts are washed with water, dried over sodium sulfate and concentrated under reduced pressure. The residue is chromatographed on alkaline alumina with 8:2 hexane:ether to yield 3-(4'-methoxytetrahydropyran-4'-yloxy)-17α-chloroethynylestra - 1,3,5(10) - trien-17β-ol which may be recrystallized from methanol.

By the same procedure but replacing 1,2-dichloroethylene with other halogenated ethylenes, such as 1-chloro-2-fluoroethylene, 1,2-dibromoethylene, and the like, provide the corresponding compound with a 17α-fluoroethynyl substituent or 17α-bromoethynyl substituent, respectively.

Following the same procedure but replacing the 3-(4'-methoxytetrahydropyran-4'-yloxy)-estra - 1,3,5(10)-trien-17-one with the corresponding 17-keto compounds having substituents at C–1, C–7, C–16 and C–18 as indicated in Formula V, the corresponding 17α-haloethylene compounds are obtained.

Example 16

Following the procedure of Example 3 but replacing 3-(4'-methoxytetrahydropyran-4'-yloxy) - estra-1,3,5(10)-trien-17-one with estra-1,3,5(10)-trien-3-ol-17-one yields estra-1,3,5(10)-triene-3,17-diol. By the same procedure, estra-1,3,5(10)-triene-3,17-diols having hydrogen, methoxy and hydroxy, at C–1; hydrogen or methyl at C–7; hydrogen or hydroxy at C–16; and hydrogen or methyl at C–18 are obtained from the corresponding estra-1,3,5 (10)-trien-3-ol-17-ones.

Example 17

Following the procedure of Example 1 but replacing estra-1,3,5(10)-trien-3-ol-17-one with estra-1,3,5(10-triene-3,17-diol and using 4 ml. of the 4'-methoxy-5',6'-dihydro-2H-pyran instead of 2 ml. yields 3,17β-bis(4'-methoxytetrahydropyran-4'-yloxy)-estra-1,3,5(10)-triene.

Following the procedure of Example 2 but replacing estra-1,3,5(10),7-tetraen-3-ol-17-one with estra-1,3,5(10), 7-tetraen-3,17β-diol and using 4 ml. of the 4'-methoxy-5',6'-dihydro-2H-pyran instead of 2 ml. yields 3,17β-bis (4'-methoxytetrahydropyran-4'-yloxy) - estra-1,3,5(10),7-tetraene.

By the same procedures, 3,17β-bis(4'-methoxytetrahydropyran-4'-yloxy)-estra - 1,3,5(10)-trienes and 3,17β-bis (4'-methoxytetrahydropyran - 4' - yloxy)-estra-1,3,5(10), 7-tetraenes having hydrogen, methoxy, acetoxy, or other ester groups at C–1; hydrogen or methyl at C–7; hydrogen, acetoxy, or other ester at C–16; and hydrogen or methyl at C–18 are obtained from the corresponding diols.

Example 18

Following the procedure of Example 9 but replacing 3-(4'-methoxytetrahydropyran - 4'-yloxy)-estra-1,3,5(10)-trien-17-one with estra-1,3,5(10)-trien-3-ol-17-one or estra-1,3,5(10),7-tetraen-3-ol - 17 - one yields 17α-methyl-estra-1,3,5(10)-triene-3,17β-diol and 17α-methylestra-1,3, 5(10),7-tetraene-3,17β-diol, respectively.

Substituting these products for estra-1,3,5(10)-triene-3,17β-diol and estra-1,3,5(10),7-tetraene-3,17β-diol in the process of Example 17 yields 3,17β-bis(4'-methoxytetrahydropyran-4'-yloxy)-17α-methylestra - 1,3,5(10) - triene and 3,17β-bis(4' - methoxytetrahydropyran-4'-yloxy)-17α-methylestra-1,3,5(10),7-tetraene, respectively.

Example 19

Following the procedure of Example 10 but replacing 3-(4'-methoxytetrahydropyran - 4'-yloxy)-estra-1,3,5(10)-trien-17-one with estra - 1,3,5(10) - trien-3-ol-17-one or estra-1,3,5(10),7-tetraen - 3 - ol - 17-one yields 17α-vinylestra-1,3,5(10) - triene - 3,17-diol or 17α-vinylestra-1,3,5(10),7-tetraene-3,17-diol, respectively.

Following the procedure of Example 17 but replacing estra-1,3,5(10)-triene - 3,17 - diol and estra-1,3,5(10),7-tetraene-3,17β-diol with the last named 17α-vinyl compounds yields 3,17β - bis(4' - methoxytetrahydropyran-4'-yloxy)-17α-vinylestra-1,3,5(10)-triene and 3,17β-bis(4'-methoxytetrahydropyran - 4' - yloxy)-17α-vinylestra-1,3,5 (10,7-tetraene, respectively.

Example 20

Following the procedure of Example 11 but replacing 3-(4' - methoxytetrahydropyran - 4' - yloxy) - estra - 1,3,5 (10)-trien-17-one with estra-1,3,5(10)-trien-3-ol-17-one or estra-1,3,5(10),7-tetraen-3-ol-17-one yields 17α-ethynylestra-1,3,5(10)-triene-3,17-diol and 17α-ethynylestra-1,3,5(10),7-tetraene-3,17-diol, respectively.

Substituting these products for estra-1,3,5(10)-triene-3,17-diol and estra-1,3,5(10),7-tetraene-3,17β-diol in the process of Example 17 yields 3,17β-bis(4'-methoxytetrahydropyran-4'-yloxy)-17α-ethynylestra - 1,3,5(10) - triene and 3,17β-bis(4'-methoxytetrahydropyran-4'-yloxy)-17α-ethynylestra-1,3,5(10),7-tetraene.

Example 21

Following the procedure of Example 15 but replacing 3 - (4' - methoxytetrahydropyran - 4' - yloxy) - estra-1,3,5 (10)-trien-17-one with estra-1,3,5(10)-trien-3-ol-17-one or estra-1,3,5(10),7-tetraen-3-ol-17-one yields 17α-chloroethynylestra-1,3,5(10) - triene - 3,17-diol and 17α-chloroethynylestra-1,3,5(10),7-tetraene-3,17-diol, respectively.

Substituting these products for estra-1,3,5(10)-triene-3,17β-diol and estra-1,3,5(10),7-tetraene-3,17β-diol in the procedure of Example 17 yields 3,17β-bis(4'-methoxytetrahydropyran-4'-yloxy) - 17α - chloroethynylestra-1,3,5 (10)-triene and 3,17β-bis(4'-methoxytetrahydropyran-4'-yloxy)-17α-chloroethynylestra-1,3,5(10),7 - tetraenes, respectively.

Example 22

Following the procedure of Example 12 but replacing 3-(4'-methoxytetrahydropyran-4'-yloxy) - 17α - ethynyl-3,17β-diacetoxyestra-1,3,5(10)-triene with 17α-ethynyl-3,17β-diacetoxyestra - 1,3,5(10) - triene or 17α-ethynyl-3,17β - diacetoxyestra-1,3,5(10),7-tetraene yields 17α-(2'',2'' - difluorocyclopropenyl) - 3,17β - diacetoxyestra-1,3,5(10)-triene and 17α-(2'',2''-difluorocyclopropenyl)-3,17β-diacetoxyestra-1,3,5(10),7-tetraene, respectively.

A solution of 0.17 g. of potassium hydroxide in 0.2 ml. of water and 2.5 ml. of methanol is added over 30 minutes to a refluxing solution of 1 g. of 17α-(2'',2''-difluorocyclopropenyl) - 3,17β - diacetoxyestra-1,3,5(10)-triene or 17α - (2'',2''-difluorocyclopropenyl)-3,17β-di-diacetoxyestra-1,3,5(10),7-tetraene in 30 ml. of methanol under nitrogen. The solution is refluxed for two hours, cooled, neutralized with acetic acid and concentrated under reduced pressure. After the addition of water, the solid which forms is collected by filtration and drived to yield 17α - (2'',2'' - difluorocyclopropenyl) - estra-1,3,5(10)-triene-3,17β-diol or 17α-(2'',2''-difluorocyclopropenyl)-estra-1,3,5(10),7-tetraene - 3,17β - diol respectively, which is recrystallized from acetone:hexane.

Repeating the procedure of Example 1 but replacing estra-1,3,5(10)-trien-3-ol-17-one with 17α-(2'',2'' - difluorocyclopropenyl)-estra-1,3,5(10)-triene - 3,17 - diol and using 4 ml. instead of 2 ml. of 4'-methoxy-5',6'-dihydro-2H-pyran yields 3,17β-bis(4'-methoxytetrahydropyran-4'-yloxy) - 17α - (2'',2'' - difluorocyclopropenyl)-estra-1,3,5(10)-triene.

Repeating the procedure of Example 2 but replacing estra-1,3,5(10),7-tetraen-3-ol-17-one with 17α - (2'',2''-difluorocyclopropenyl) - estra - 1,3,5(10),7 - tetraene-3,17β-diol and using 4 ml. instead of 2 ml. of 4'-methoxy-5',6'-dihydro-2H-pyran yields 3,17β-bis(4'-methoxytetrahydropyran-4'-yloxy) - 17α - (2'',2'' - difluorocyclopropenyl)-estra-1,3,5(10),7-tetraene.

Following the same procedure, other 3,17β-bis(4'-methoxytetrahydropyran-4'-yloxy)-17α-(2'',2'' - difluorocyclopropenyl)-estratrienes and estratetraenes having groups at C–1, C–7, C–16 and C–18 as indicated in Formula VIII are obtained.

Example 23

Following the procedure of Example 4, paragraph 1, but replacing 3 - (4'-methoxytetrahydropyran-4'-yloxy)-estra-1,3,5(10)-trien-17β-ol with estra-1,3,5(10)-trien-3-ol-17-one or estra-1,3,5(10),7-tetraen-3-ol-17-one, 3-cyclopentoxyestra-1,3,5(10)-trien-17-one or 3-cyclopentoxyestra-1,3,5(10),7-tetraen-17-one are obtained. Repeating this procedure with estratrien-3-ol-17-ones having hydrogen, methyl or methoxy groups at C–1; hydrogen or methyl groups at C–7; hydrogen, methoxy or hydrolyzable esters at C–16α; and hydrogen or methyl groups at C–18 yields the corresponding 3-cyclopentoxyestratrien-(or -tetraen)-17-ones, e.g. 3-cyclopentoxy-18-methylestra-1,3,5(10)-trien-17-one.

To a refluxing solution of 5 g. of estra-1,3,5(10)-trien-3-ol-17-one or estra-1,3,5-(10),7-tetraen-3-ol-17-one in 500 ml. of ethanol are added over a 30 minute period 20 ml. of dimethyl sulfate and 80 g. of potassium hydroxide in 50 ml. of water, 5 ml. portions of each being alternatively added. The mixture is then refluxed for 45 minutes, cooled and poured into ice water. The solid which forms upon neutralization with dilute acetic acid is collected, washed with water and dried to yield 3-methoxyestra-1,3,5(10)-trien-17-one and 3-methoxyestra-1,3,5(10),7-tetraen-17-one, respectively, which is recrystalized from chloroform:methanol. Following the same procedure, ethers having hydrogen, methyl or methoxy groups at C–1; hydrogen or methyl groups at C–7; hydrogen, methoxy or hydrolyzable ester groups at C–16α; and hydrogen or methyl groups at C–18 are obtained from the corresponding 3-hydroxy compounds.

Example 24

Two milliliters of dihydropyran are added to a solution of 1 g. of estra-1,3,5(10)-trien-3-ol-17-one in 15 ml. of benzene. About 1 ml. is removed by distillation to remove moisture and 0.4 g. of p-toluenesulfonic acid is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3-tetrahydropyran-2'-yloxyestra - 1,3,5(10) - trien-17-one which is recrystallized from pentane.

Two milliliters of dihydropyran are added to a solution of 1 g. of estra-1,3,5(10),7-tetraen-3-ol-17-one in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 3-tetrahydropyran-2'-yloxyestra-1,3,5(10),7-tetraen-17-one which is recrystallized from pentane.

Following the same procedure with substituted estra- 1,3,5(10)-trien-3-ol-17-ones and estra-1,3,5(10),7-tetraen-3-ol-17-ones having hydrogen, methyl, methoxy or hydrolyzable ester groups at C–1; hydrogen or methyl groups at C–7; hydrogen, methoxy or hydrolyzable ester groups at C–16α; and hydrogen or methyl groups at C–18 yields the corresponding 3-tetrahydropyran - 2 - yloxy compounds, e.g. 3-tetrahydropyran-2′-yloxy-18-methylestra-1,3,5(10)-trien-17-one.

Example 25

Following the procedure of Example 3 but replacing 3-(4′-methoxytetrahydropyran-4′-yloxy) - estra - 1,3,5(10)-trien-17-one with estra-1,3,5(10)-trien-3-ol-17-one or estra-1,3,5(10)-7-tetraen-3-ol-17-one, estra - 1,3,5(10)-trien-3,17β-diol or estra-1,3,5(10),7-tetraen-3,17β-diol, respectively, are obtained.

Following the same procedure, 3,17β-diols and 3-ether-17β-ols having hydrogen, methyl, hydroxy or methoxy at C–1; hydrogen or methyl groups at C–7; hydrogen, methoxy or hydroxy at C–16α; and hydrogen or methyl groups at C–18 are obtained from the corresponding 17-ones, e.g. 18-methylestra-1,3,5(10)-trien-3,17β-diol, estra-1,3,5(10)-trien-3,16α,17β-triol, 7α-methylestra-1,3,5(10)-trien-3,17β-diol, 1-methylestra-1,3,5(10) - trien - 3,17β-diol, estra-1,3,5(10)-trien-1,3,17β-triol, 3-methoxyestra-1,3,5(10)-trien-17β-ol, 3 - cyclopentoxy-18-methylestra-1,3,5(10)-trien-17β-ol, estra-1,3,5(10)-trien-3,17β-diol, 3-tetrahydropyran-2′-yloxyestra-1,3,5(10)-trien-17β-ol, 3-tetrahydropyran-2′-yloxy-18-methylestra-1,3,5(10) - trien-17β-ol, etc.

Example 26

Repeating the procedure of Example 9 but replacing 3-(4′-methoxytetrahydropyran - 4′ - yloxy)-estra-1,3,5-(10)-trien-17-one with estra-1,3,5(10)-trien-3-ol-17-one or estra-1,3,5(10),7-tetraen-3-ol-17-one, 17α - methylestra-1,3,5(10)-trien-3,7β-diol and 17α - methylestra-1,3,5(10),7-tetraen-3,17β-diol, respectively, are obtained.

Example 27

Repeating the procedure of Example 9 but replacing 3 - (4′-methoxytetrahydropyran-4′-yloxy)-estra-1,3,5(10)-trien-17-one with estra-1,3,5(10)-trien-3-ol-17-one or estra-1,3,5(10),7-tetraen-3-17-one, 17α - methylestra-1,3,5-(10)-trien-3,17β-diol and 17α-vinylestra-1,3,5(10),7-tetraen-3,17β-diol, respectively, are obtained. Similarly, other 17α-(lower)-alkenyl derivatives are obtained using the respective lower alkenyl magnesium bromides in the above procedure.

Example 28

Repeating the procedure of Example 11 but replacing 3 - (4′-methoxytetrahydropyran-4′-yloxy)-estra-1,3,5-(10)-trien-17-one with estra-1,3,5(10)-trien-3-ol-17-one or estra-1,3,5(10),7-tetraen-3-ol-17-one, 17α-ethynylestra-1,3,5(10) - trien-3,17β - diol and 17α-ethynylestra-1,3,5-(10),7-tetraen-3,17β-diol, respectively, are obtained. By the same procedure using as starting materials having hydrogen, methyl or methoxy groups at C–1; ether or hydroxy groups at C–3; hydrogen or methyl groups at C–7; hydrogen, methoxy or hydroxy groups at C–16α; and hydrogen or methyl groups at C–18, the corresponding 17α-ethynyl compounds are obtained, e.g. 17α-ethynyl-18-methylestra-1,3,5(10)-trien-3,17β-diol, 17α-ethynyl-estra-1,3,5(10) - trien - 3,16α,17β-triol, 17α-ethynylestra-1,3,5(10)-trien-1,3,17β-triol, 3-methoxy-17α-ethynylestra-1,3,5(10)-trien-17β-ol, 3 - cyclopentoxy-17α-ethynylestra-1,3,5(10)-trien-17β-ol, 3 - cyclopentoxy-17α-ethynyl-18-methylestra-1,3,5(10)-trien-17β-ol, etc.

Example 29

Repeating the procedure of Example 15 but replacing 3 - (4′-methoxytetrahydropyran-4′-yloxy)-estra1,3,5-(10)-trien-17-one with estra-1,3,5(10)-trien-3-ol-17-one or estra-1,3,5(10),7-tetraen-3-ol-17-one, 17α-chloroethynylestra-1,3,5(10)-trien-3,17β-diol and 17α-chloroethynyl-1,3,5(10),7-tetraen-3,17β-diol are obtained. Repeating the procedure with 3-methoxyestra - 1,3,5(10) - trien-17β-ol yields 3-methoxy-17α-chloroethynylestra-1,3,5(10)-trien-17β-ol. Similarly, products having other substituents at C–1, C–7, C–16 and C–18 are obtained from the corresponding substituted 17-ones by this procedure.

Example 30

Repeating the procedure of Example 5 but replacing 3 - (4′-methoxytetrahydropyran-4′-yloxy)-estra-1,3,5(10)-trien-17β-ol with 17α-ethynylestra-1,3,5(10)-trien-3,17β-diol, 3,17β-diacetoxy-17α-ethynylestra-1,3,5(10)-trien is obtained. Following the procedure of Example 7 but replacing 3-(4′-methoxytetrahydropyran - 4′ - yloxy)-estra-1,3,5(10),7-tetraen-17β-ol with 17α-ethynylestra - 1,3,5-(10),7-tetraen-3,17β-diol, 3,17β-diacetoxy - 17α - ethynylestra-1,3,5(10),7-tetraene is obtained.

Following the procedure of Example 12 but replacing 3-(4′-methoxytetrahydropyran-4′-yloxy)-17α-ethynyl-17β-acetoxyestra-1,3,5(10)-triene with 3,17β-diacetoxy-17α-ethynylestra-1,3,5(10)-triene or 3,17β-diacetoxy-17α-ethynylestra-1,3,5(10),7 - tetraene, 3,17β-diacetoxy-17α-(2″, 2″ - difluorocyclopropenyl) - estra-1,3,5(10) - triene and 3,17β - diacetoxy - 17α-(2″,2″ - difluorocyclopropenyl)-estra-1,3,5(10),7-tetrane, respectively, are obtained.

Repeating these same procedures with the other substituted compounds represented by Formula IV yields the corresponding C–1, C–7, C–16 and C–18 substituted products having 17α - (2″,2″ - difluorocyclopropenyl) groups as described with respect to Formula X.

Example 31

A mixture of 1 g. of estra-1,3,5(10)-triene-3,17β-diol, 4 ml. of pyridine and 2 ml. of acetic anhydride is allowed to stand at room temperature for 15 hours. The mixture is then poured into ice water and the solid which forms is collected by filtration, washed with water and dried. The mixture is chromatographed on neutral alumina, eluting with ether:hexane, to yield 3-acetoxyestra-1,3,5(10)-trien-17β-ol.

Similarly, C–3 esters having hydrogen, methyl, acyloxy or methoxy groups at C–1; hydrogen or methyl groups at C–7; hydrogen, methoxy or hydrolyzable esters at C–16α; hydrogen, lower alkyl, lower alkenyl, lower alkynyl, lower haloalkynyl and difluorocyclopropenyl at C–17α; and hydrogen or methyl groups at C–18 are obtained from the corresponding 3,17β-dihydroxy compounds as listed below:

3-acetoxy-17α - (2″,2″ - difluorocyclopropenyl)-estra-1,3,5(10)-trien-17βol,
3-acetoxy-18-methylestra-1,3,5(10)-trien-17βol,
3,16α-diacetoxyestra-1,3,5(10)-trien-17β-ol,
3-acetoxy-17α-ethynylestra-1,3,5(10)-trien-ol
3-acetoxy-17β,17α-ethynyl - 18 - methylestra-1,3,5(10)-trien-17βol,
3,16α-diacetoxy - 17α - ethynylestra - 1,3,5(10)-trien-17β-ol,
3-acetoxy-7α-methylestra-1,3,5(10)-trien-ol,
1-methyl-3-acetoxyestra-1,3,5(10)-trien-17β-ol,
1,3-diacetoxyestra-1,3,5(10)-trien-17β-ol,
1,3 - diacetoxy-17α-ethynylestra-1,3,5(10)-trien-17β-ol, etc.

To a solution of 5 g. of estra-1,3,5(10)-triene-3,17β-diol in 100 ml. of anhydrous benzene are added 1 g. of p-toluenesulfonic acid and 10 ml. of undecenoic anhydride. The mixture is allowed to stand for 24 hours at room temperature and poured with stirring into ice and water. The organic phase is separated, washed with 10% sodium carbonate solution and with water, and dried. The mixture is then chromatographed on neutral alumina, eluting with ether:hexane, to yield 3-undecenoyloxy-estra-1,3,5(10)-trien-17β-ol. Similarly, estra - 1,3,5(10)-triene-3,17β-diols having groups at C–1, C–16, C–17α and C–18 as indicated in Formula VII are converted to the corresponding 3-esters by this procedure.

A solution of 1 g. of estra-1,3,5(10),7-tetraene-3, 17β-diol in 16 ml. of anhydrous ether is treated with 7.5 molar equivalents of ethylmagnesium bromide in ether and, after a few minutes, with 7.5 after a few minutes, with 7.5 molar equivalents of acetyl chloride. The mixture is allowed to stand at room temperature for 15 hours, then diluted with water and extracted with methylene chloride. The extracts are washed with water to neutrality, dried and evaporated. The residue is chromatographed on neutral alumina, eluting with ether:hexane, to yield 3 - acetoxyestra - 1,3,5(10),7 - tetraen - 17β - which is recrystallized from acetone:hexane.

A mixture of 2 g. of estra-1,3,5(10)-triene-3,17β-diol in 8 ml. of pyridine and an equivalent molar amount of benzoyl chloride is heated at steam bath temperatures for 30 minutes. The mixture is then poured into ice water and the solid which forms is collected by filtration, washed with water and dried. The mixture is chromatographed on neutral alumina, eluting with ether:hexane, to yield 3 - benzoyloxyestra - 1,3,5(10) - trien - 17β - ol which is recrystallized from acetone:hexane. Repeating this procedure with estra - 1,3,5(10),7 - tetraene - 3,17β - diol yields 3-benzoyloxyestra-1,3,5(10),7 - tetraen - 17β - ol. Following the same procedure, estratrien-17β-ols and estratetraen-17β-ols having groups at C–1, C–7, C–16, C–17α and C–18 as indicated in Formula VII are converted to the corresponding 3-benzoyloxy compounds.

Example 32

Following the procedure of Example 1 but replacing estra - 1,3,5(10) - trien - 3 - ol - 17 - one with 3 - acetoxyestra - 1,3,5(10) - trien - 17 - ol, 3 - acetoxy - 17β - (4'-methoxytetrahydropyran - 4' - yloxy) - estra - 1,3,5(10)-triene is obtained. Following the procedure of Example 2 but replacing estra - 1,3,5(10),7 - tetraen - 3 - ol - 17 - one with 3 - acetoxyestra - 1,3,5(10),7 - tetraen - 17 - ol, 3-acetoxy - 17β - (4' - methoxytetrahydropyran - 4' - yloxy)-estra-1,3,5(10),7-tetraene is obtained. Repeating these procedures with 17-hydroxy compounds having acyloxy and ether groups at C–3; hydrogen, methyl, acetoxy or methoxy groups at C–1; hydrogen or methyl groups at C–7; hydrogen, methoxy or hydrolyzable esters at C–16α; hydrogen, lower alkyl, lower alkenyl, lower alkynyl, lower haloalkenyl and difluorocyclopropenyl groups at C–17α; and hydrogen or methyl groups at C–18, the corresponding 17β-(4'-methoxytetrahydropyran - 4' - yloxy) ethers are obtained, e.g.

3-acetoxy-17β-(4'-methoxytetrahydropyran-4'-yloxy)-17α-(2″,2″-difluorocyclopropenyl)-estra-1,3,5(10)-triene,
3-acetoxy-17β-(4'-methoxytetrahydropyran-4'-yloxy)-18-methylestra-1,3,5(10)-triene,
3,16α-diacetoxy-17β-(4'-methoxytetrahydropyran-4'-yloxy)-estra-1,3,5(10)-triene,
3-acetoxy-17β-(4'-methoxytetrahydropyran-4'-yloxy)-17α-ethynylestra-1,3,5(10)-triene,
3-acetoxy-17β-(4'-methoxytetrahydropyran-4'-yloxy)-17α-ethynyl-18-methylestra-1,3,5(10)-triene,
3,16α-diacetoxy-17β-(4'-methoxytetrahydropyran-4'-yloxy)-17α-ethynylestra-1,3,5(10)-triene,
3-acetoxy-7α-methyl-17β-(4'-methoxytetrahydropyran-4'-yloxy)-estra-1,3,5(10)-triene,
1-methyl-3-acetoxy-17β-(4'-methoxytetrahydropyran-4'-yloxy)-estra-1,3,5(10)-triene,
1,3-diacetoxy-17β-(4'-methoxytetrahydropyran-4'-yloxy)-estra-1,3,5(10)-triene,
1,3-diacetoxy-17β-(4'-methoxytetrahydropyran-4'-yloxy)-17α-ethynylestra-1,3,5(10)-triene,
3-methoxy-17β-(4'-methoxytetrahydropyran-4'-yloxy)-17α-ethynylestra-1,3,5(10)-triene,
3-methoxy-17β-(4'-methoxytetrahydropyran-4'-yloxy)-estra-1,3,5(10)-triene,
3-methoxy-17β-(4'-methoxytetrahydropyran-4'-yloxy)-17α-chloroethylnylestra-1,3,5(10)-triene,
3-cyclopentyloxy-17β-(4'-methoxytetrahydropyran-4'-yloxy)-estra-1,3,5(10)-triene,
3-cyclopentyloxy-17β-(4'-methoxytetrahydropyran-4'-yloxy)-18-methylestra-1,3,5(10)-triene,
3-cyclopentyloxy-17β-(4'-methoxytetrahydropyran-4'-yloxy)-17α-ethynylestra-1,3,5(10)-triene,
3-cyclopentyloxy-17β-(4'-methoxytetrahydropyran-4'-yloxy)-17α-ethynyl-18-methylestra-1,3,5(10)-triene,
3-benzoyloxy-17β-(4'-methoxytetrahydropyran-4'-yloxy)-estra-1,3,5(10)-triene,
3-tetrahydropyran-2'-yloxy-17β-(4'-methoxytetrahydropyran-4'-yloxy)-estra-1,3,5(10)-triene, and
3-tetrahydropyran-2'-yloxy-17β-(4'-methoxytetrahydropyran-4'-yloxy)-18-methylestra-1,3,5(10)-triene,

Example 33

A solution of 0.17 g. of potassium hydroxide in 0.2 ml. of water and 2.5 ml. of methanol is added over 30 minutes to a refluxing solution of 1 g. of 3-acetoxy-17β-(4'-methoxytetrahydropyran - 4' - yloxy) - estra - 1,3,5(10)-triene or 3-acetoxy - 17β - (4'-methoxytetrahydropyran-4'-yloxy)estra-1,3,5(10),7-tetraene in 30 ml. of methanol under nitrogen. The solution is refluxed for two hours, cooled, neutralized with dilute acetic acid, and concentrated under reduced pressure. After the addition of water, the solid which forms is collected by filtration and dried to yield 17β-(4'-methoxytetrahydropyran-4'-yloxy) - estra - 1,3,5(10) - trien - 3 - ol or 17β-(4'-methoxytetrahydropyran - 4' - yloxy) - estra - 1,3,5(10), 7-tetraen-3-ol, respectively which is recrystallized from acetone: hexane.

Repeating this procedure with the other acylated products obtained in the procedure of Example 32 yields hydroxy compounds having hydrogen, methyl, methoxy of hydroxy groups at C–1; hydrogen or methyl groups at C–7; hydrogen, methoxy or hydroxy groups at C–16α; and hydrogen or methyl groups at C–18, for example:

17β-(4'-methoxytetrahydropyran-4'-yloxy)-18-methyl-estra-1,3,5(10)-trien-3-ol,
17β-(4'-methoxytetrahydropyran-4'-yloxy)-estra-1,3,5(10)-triene-2,16α-diol
17β-(4'-methoxytetrahydropyran-4'-yloxy)17α-ethynyl-estra-1,3,5(10)-trien-3-ol,
17β-(4'-methoxytetrahydropyran-4'-yloxy)-17α-ethynyl-18-methylestra-1,3,5(10)-trien-3-ol,
17β-(4'-methoxytetrahydropyran-4'-yloxy)-17α-ethynlyl-estra-1,3,5(10)-triene-3,16α,diol,
7α-methyl-17β-(4'-methoxytetrahydropyran-4'-yloxy)-estra-1,3,5(10)-trien-3-ol,
1-methyl-17β-(4'-methoxytetrahydropyran-4'-yloxy)-estra-1,3,5(10)-trien-3-ol,
1-hydroxy-17β-(4'-methoxytetrahydropyran-4'-yloxy)-estra-1,3,5(10)-trien-3-ol,
17β-(4'-methoxytetrahydropyran-4'-yloxy)-17α-(2″,2″-difluorocyclopropenyl)-estra-1,3,5(10)-trien-3-ol,
17β-(4'-methoxytetrahydropyran-4'-yloxy)-17α-chloroethynylestra-1,3,5(10)-trien-3-ol, etc.

What is claimed is:

1. A 4'-(lower)alkoxytetrahydropyran-4'-yl ether of an estra-1,3,5(10)-triene having at position C–1, a member selected from the group consisting of hydrogen, methyl, methoxy, hydroxy and conventional hydrolyzable esters thereof, and 4'-(lower)alkoxytetrahydropyran-4'-yloxy; at position C–7,8 a member selected from the group consisting of a single bond and a double bond; at position C–7, a member selected from the group consisting of hydrogen and methyl, said last named member having either α or β configuration when the bond at C–7,8, is a single bond; at position C–16α when the bond at C–7,8 is a single bond, a member selected from the group consisting of hydrogen, hydroxy and conventional hydrolyzable esters thereof and when the bond at C–7,8 is a double bond, hydrogen is at position C–16α; at position C–17α, a member selected from the group consisting of hydrogen, lower alkyl, lower alkenyl, lower haloalkenyl, lower alkynyl, 2″,2″-difluorocyclopropenyl and in conjunction with C–17β, keto; at positions C–3 and C–17β, members selected from the group consisting of hydrogen, hydroxy and conventional hydrolyzable esters thereof, lower alkoxy, lower cycloalkoxy, lower cycloalkenyloxy, tetrahydropyran-2′-yloxy and 4′-(lower) alkoxytetrahydropyran-4′-yloxy, at least one of said members at said C–3 and C–17β positions being a 4′-(lower) alkoxytetrahydropyran-4′-yloxy group.

2. The steroid ether of claim 1 wherein the ether is 3-(4′-methoxytetrahydropyran-4′-yloxy)-estra-1,3,5(10)-trien-17-one.

3. The steroid ether of claim 1 wherein the ether is 3-(4′-methoxytetrahydropyran-4′-yloxy)-estra-1,3,5(10)-trien-17β-ol.

4. The steroid ether of claim 1 wherein the ether is 3-(4′-methoxytetrahydropyran-4′-yloxy) - 17α - ethynyl-estra-1,3,5(10)-trien-17β-ol.

5. The steroid ether of claim 1 wherein the ether is 3-(4′-methoxytetrahydropyran-4′-yloxy)-7α-methyl - 17α-ethynylestra-1,3,5(10)-trien-17β-ol.

6. The steroid ether of claim 1 wherein the ether is 3 - (4′-methoxytetrahydropyran-4′-yloxy) - 17β - cyclopentoxyestra-1,3,5(10)-trien-17β-ol.

7. The steroid ether of claim 1 wherein the ether is 3 - (4′-methoxytetrahydropyran-4′-yloxy)-estra-1,3,5(10),7-tetraen-17-one.

8. The steroid ether of claim 1 wherein the ether is 3,17β-bis(4′-methoxytetrahydropyran - 4′ - yloxy)-estra-1,3,5(10)-triene.

9. The steroid ether of claim 1 wherein the ether is 1,3-bis(4′ - methoxytetrahydropyran - 4′ - yloxy) - 17α-ethynylestra-1,3,5(10)-trien-17β-ol.

10. The steroid ether of claim 1 wherein the ether is 1,3-bis(4′-methoxytetrahydropyran - 4′ - yloxy) - 17α-ethnyl-17β-acetoxyestra-1,3,5(10)-triene.

11. The steroid ether of claim 1 wherein the ether is 17β-(4′ - methoxytetrahydropyran - 4′ - yloxy) - estra-1,3,5(10)-trien-3-ol.

12. The steroid ether of claim 1 wherein the ether is 17β - (4′ - methoxytetrahydropyran-4′-yloxy)-18-methyl-estra-1,3,5(10)-trien-3-ol.

13. The steroid ether of claim 1 wherein the ether is 3-cyclopentoxy-17β-(4′-methoxytetrahydropyran - 4′-yloxy)-estra-1,3,5(10)-triene.

14. The steroid ether of claim 1 wherein the ether is 3-cyclopentoxy-17β-(4′ - methoxytetrahydropyran - 4′-yloxy)-18-methylestra-1,3,5(10)-triene.

15. The steroid ether of claim 1 wherein the ether is 3-acetoxy-17β-(4′-methoxytetrahydropyran - 4′ - yloxy)-estra-1,3,5(10)-triene.

16. The steroid ether of claim 1 wherein the ether is 3-tetrahydropyran-2′-yloxy-17β-(4′ - methoxytetrahydropyran-4′-yloxy)-estra-1,3,5(10)-triene.

17. The steroid ether of claim 1 wherein the ether is 3-cyclopentoxy - 17α - ethynyl - 17β-(4′-methoxytetrahydropyran-4′-yloxy)-estra-1,3,5(10)-triene.

18. The steroid ether of claim 1 wherein the ether is 3-cyclopentoxy-17α-ethynyl-17β-(4′ - methoxytetrahydropyran-4′-yloxy)-18-methylestra-1,3,5(10)-triene.

19. The steroid ether of claim 1 wherein the ether is 1,3-diacetoxy-17α-ethynyl-17β-(4′ - methoxytetrahydropyran-4′-yloxy)-estra-1,3,5(10)-triene.

20. The steroid ether of claim 1 wherein the ether is 17α-ethynyl-17β-(4′ - methoxytetrahydropyran-4′-yloxy)-estra-1,3,5(10)-triene-3,16α-diol.

21. The steroid ether of claim 1 wherein the ether is 17β - (4′ - methoxytetrahydropyran-4′-yloxy)-estra-1,3,5(10),7-tetraen-3-ol.

References Cited

UNITED STATES PATENTS

| | | | |
|---|---|---|---|
| 3,256,273 | 6/1966 | Cross | 260—239.55 |
| 3,290,297 | 12/1966 | Cross | 260—239.55 |
| 3,294,786 | 12/1966 | Cross et al. | 260—239.55 |

HENRY A. FRENCH, Primary Examiner

U.S. Cl. X.R.

260—397.4, 397.5, 999